United States Patent
Zhou

(10) Patent No.: US 12,315,269 B2
(45) Date of Patent: May 27, 2025

(54) METHOD AND DEVICE FOR DETERMINING RELIABILITY OF VISUAL DETECTION

(71) Applicant: NIO TECHNOLOGY (ANHUI) CO., LTD, Hefei (CN)

(72) Inventor: Hang Zhou, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 393 days.

(21) Appl. No.: 17/868,310

(22) Filed: Jul. 19, 2022

(65) Prior Publication Data
US 2023/0034979 A1 Feb. 2, 2023

(30) Foreign Application Priority Data

Jul. 30, 2021 (CN) .......................... 202110872000.0

(51) Int. Cl.
G06V 20/56 (2022.01)
G06V 10/44 (2022.01)
G06V 10/98 (2022.01)
B60W 60/00 (2020.01)

(52) U.S. Cl.
CPC ............ *G06V 20/588* (2022.01); *G06V 10/44* (2022.01); *G06V 10/98* (2022.01); *B60W 60/00* (2020.02); *B60W 2420/403* (2013.01); *B60W 2552/53* (2020.02)

(58) Field of Classification Search
CPC ....... B60W 2420/403; B60W 2552/53; B60W 60/00; G06V 10/44; G06V 10/776; G06V 10/98; G06V 20/588
See application file for complete search history.

(56) References Cited

U.S. PATENT DOCUMENTS

| 11,400,929 | B2* | 8/2022 | Nassouri | B60W 30/09 |
| 2007/0100551 | A1* | 5/2007 | Ishikura | B60T 8/17557 701/41 |
| 2009/0284597 | A1* | 11/2009 | Nakamori | G06T 7/90 382/104 |
| 2010/0079590 | A1* | 4/2010 | Kuehnle | G06V 20/588 340/436 |

(Continued)

FOREIGN PATENT DOCUMENTS

| CN | 103448722 | 12/2013 |
| CN | 111516673 | 8/2020 |

OTHER PUBLICATIONS

Lin Li et al.,"Lane Marking Detection and Reconstruction with Line-Scan Imaging Data," May 20, 2018, Sensors 2018,18,1635, pp. 1-20.*

(Continued)

*Primary Examiner* — Omar S Ismail
(74) *Attorney, Agent, or Firm* — Sheridan Ross P.C.

(57) ABSTRACT

The disclosure relates to a method for determining reliability of visual detection, the method including: receiving a visually detected lane line parameter; comparing a historical lane line parameter with the received lane line parameter, to calculate a historical shrinkage degree of a lane line; and determining, based on the historical shrinkage degree, whether there is an error in the visual detection. The disclosure further relates to a device for determining reliability of visual detection, a computer storage medium, an autonomous driving system, and a vehicle.

18 Claims, 2 Drawing Sheets

1000

S110

S120

S130

(56) References Cited

U.S. PATENT DOCUMENTS

| | | | | |
|---|---|---|---|---|
| 2011/0081049 | A1* | 4/2011 | Walter | G06V 20/588 |
| | | | | 382/106 |
| 2016/0314359 | A1* | 10/2016 | Sakamoto | B60K 35/81 |
| 2017/0330043 | A1* | 11/2017 | Shih | G06V 20/588 |
| 2018/0373941 | A1* | 12/2018 | Kwant | G08G 1/0145 |
| 2019/0034740 | A1* | 1/2019 | Kwant | G06V 10/462 |
| 2021/0117700 | A1* | 4/2021 | Zhang | G06N 7/01 |
| 2021/0279484 | A1* | 9/2021 | Mori | B60W 30/18163 |
| 2021/0350149 | A1* | 11/2021 | Lu | G06F 18/251 |

OTHER PUBLICATIONS

Jun Li et al.,"Deep Neural Network for Structural Prediction and Lane Detection in Traffic Scene," Feb. 15, 2017,IEEE Transactions on Neural Networks and Learning Systems, vol. 28, No. 3, Mar. 2017,pp. 690-700.*

Ze Wang et al.,"LaneNet: Real-Time Lane Detection Networks for Autonomous Driving," Jul. 4, 2018, Computer Vision and Pattern Recognition,pp. 1-8.*

Congbo Luo et al.,"Research on Image Processing Algorithm in Intelligent Vehicle System Based on Visual Navigation," May 19, 2019,Frontier Computing 2018, pp. 1678-1686.*

Haiyan Guan et al.,"Using mobile laser scanning data for automated extraction of road markings," Dec. 4, 2013, ISPRS Journal of Photogrammetry and Remote Sensing 87 (2014),pp. 93-104.*

Mohamed Aly,"Real time Detection of Lane Markers in Urban Streets," Sep. 5, 2008, 2008 IEEE Intelligent Vehicles Symposium Eindhoven University of Technology,Eindhoven, The Netherlands, Jun. 4-6, 2008,pp. 7-12.*

Extended Search Report for European Patent Application No. 22165277.9, dated Sep. 19, 2022, 8 pages.

Official Action for European Patent Application No. 22165277.9, dated Dec. 2, 2024, 5 pages.

* cited by examiner

METHOD AND DEVICE FOR DETERMINING RELIABILITY OF VISUAL DETECTION

CROSS-REFERENCE TO RELATED APPLICATION

This application claims the benefit of China Patent Application No. 202110872000.0 filed Jul. 30, 2021, the entire contents of which are incorporated herein by reference in its entirety.

TECHNICAL FIELD

The disclosure relates to the field of autonomous driving/ driver assistance control, and more particularly, to a method and device for determining reliability of visual detection, a computer storage medium, an autonomous driving system, and a vehicle.

BACKGROUND ART

[Validity of vehicle visual detection may be affected by many factors in an environment, mainly including: an unexpected strong light; wet ground with standing water; a lane line that is not completely wiped on the ground, etc. These factors may affect the quality of a visually detected lane line, and may subject a present vehicle to dangerous behaviors, such as lane departure and random operations of a steering wheel, during lane-keep traveling, thus posing safety risks.

SUMMARY OF THE DISCLOSURE

According to an aspect of the disclosure, there is provided a method for determining reliability of visual detection, the method including: receiving a visually detected lane line parameter; comparing a historical lane line parameter with the received lane line parameter, to calculate a historical shrinkage degree of a lane line; and determining, based on the historical shrinkage degree, whether there is an error in the visual detection.

As an addition or alternative to the above solution, in the above method, the receiving a visually detected lane line parameter includes: receiving a left lane line and a right lane line that are visually detected in a present frame.

As an addition or alternative to the above solution, in the above method, the comparing a historical lane line parameter with the received lane line parameter, to calculate a historical shrinkage degree of a lane line includes: calculating an inward shrinkage value of the lane line between two adjacent frames; determining whether the inward shrinkage value reaches a first threshold; and adding the inward shrinkage value up to the historical shrinkage degree of the lane line when the inward shrinkage value is greater than or equal to the first threshold.

As an addition or alternative to the above solution, in the above method, the comparing a historical lane line parameter with the received lane line parameter, to calculate a historical shrinkage degree of a lane line further includes: clearing the historical shrinkage degree of the lane line to zero when the inward shrinkage value is less than the first threshold.

As an addition or alternative to the above solution, in the above method, the first threshold is determined based on difference values of lateral distances between starting ends and between terminal ends of the left and right lane lines in the present frame.

As an addition or alternative to the above solution, in the above method, the calculating an inward shrinkage value of the lane line between two adjacent frames includes: updating a recorded lane line parameter of the previous frame based on a motion parameter of a present vehicle; comparing an updated lane line in the previous frame with a lane line corresponding to the present frame; and calculating a relative deflection trend and magnitude of an terminal end of the lane line.

As an addition or alternative to the above solution, in the above method, the relative deflection trend and magnitude of the terminal end of the lane line are an angle at which the lane line corresponding to the present frame turns inward relative to the lane line in the previous frame.

As an addition or alternative to the above solution, in the above method, the determining, based on the historical shrinkage degree, whether there is an error in the visual detection includes: comparing the historical shrinkage degree with a second threshold; and determining that there is an error in the visual detection when the historical shrinkage degree is greater than or equal to the second threshold.

As an addition or alternative to the above solution, in the above method, the determining, based on the historical shrinkage degree, whether there is an error in the visual detection further includes: determining that there is no error in the visual detection and recording the historical shrinkage degree when the historical shrinkage degree is less than the second threshold.

As an addition or alternative to the above solution, the above method further includes: outputting, upon determining that there is an error in the visual detection, a flag to prompt other modules.

According to another aspect of the disclosure, there is provided a device for determining reliability of visual detection, the device including: a receiving apparatus configured to receive a visually detected lane line parameter; a calculation apparatus configured to compare a historical lane line parameter with the received lane line parameter, to calculate a historical shrinkage degree of a lane line; and a determination apparatus configured to determine, based on the historical shrinkage degree, whether there is an error in the visual detection.

As an addition or alternative to the above solution, in the above device, the receiving apparatus is configured to receive a left lane line and a right lane line that are visually detected in a present frame.

As an addition or alternative to the above solution, in the above device, the calculation apparatus includes: a calculation unit configured to calculate an inward shrinkage value of the lane line between two adjacent frames; a determination unit configured to determine whether the inward shrinkage value reaches a first threshold; and an addition unit configured to add the inward shrinkage value up to the historical shrinkage degree of the lane line when the inward shrinkage value is greater than or equal to the first threshold.

As an addition or alternative to the above solution, in the above device, the calculation apparatus further includes: a zero-clearing apparatus configured to clear the historical shrinkage degree of the lane line to zero when the inward shrinkage value is less than the first threshold.

As an addition or alternative to the above solution, in the above device, the first threshold is determined based on difference values of lateral distances between starting ends and between terminal ends of the left and right lane lines in the present frame.

As an addition or alternative to the above solution, in the above device, the calculation unit is configured to: update a recorded lane line parameter of the previous frame based on a motion parameter of a present vehicle; compare an updated lane line in the previous frame with a lane line corresponding to the present frame; and calculate a relative deflection trend and magnitude of an terminal end of the lane line.

As an addition or alternative to the above solution, in the above device, the relative deflection trend and magnitude of the terminal end of the lane line are an angle at which the lane line corresponding to the present frame turns inward relative to the lane line in the previous frame.

As an addition or alternative to the above solution, in the above device, the determination apparatus is configured to: compare the historical shrinkage degree with a second threshold; and determine that there is an error in the visual detection when the historical shrinkage degree is greater than or equal to the second threshold.

As an addition or alternative to the above solution, in the above device, the determination apparatus is further configured to determine that there is no error in the visual detection and record the historical shrinkage degree when the historical shrinkage degree is less than the second threshold.

As an addition or alternative to the above solution, the above device further includes: an output apparatus configured to output, upon determining that there is an error in the visual detection, a flag to prompt other modules.

According to still another aspect of the disclosure, there is provided a computer storage medium including instructions, where when the instructions are run, the method as described above is performed.

According to yet another aspect of the disclosure, there is provided an autonomous driving system, the system including the device as described above.

According to still yet another aspect of the disclosure, there is provided a vehicle, the vehicle including the autonomous driving system as described above.

In the solution for determining reliability of visual detection according to the embodiments of the disclosure, by comparing the historical lane line parameter with the received lane line parameter (for example, tracking a varying status of a lane line in a plurality of preceding and subsequent frames) to calculate the historical shrinkage degree of the lane line, reliability of visually detecting a lane line can be determined to deal with visual detection errors caused by impacts of an external environment.

BRIEF DESCRIPTION OF THE DRAWINGS

The above and other objectives and advantages of the disclosure will be more thorough and clearer from the following detailed description in conjunction with the accompanying drawings, where the same or similar elements are represented by the same reference numerals.

DETAILED DESCRIPTION OF EMBODIMENTS

To make the objectives, technical solutions, and advantages of the disclosure clearer, specific embodiments of the disclosure will be described in further detail below with reference to the accompanying drawings. It can be understood that the specific embodiments described herein are used merely to explain the disclosure, rather than limit the disclosure.

In addition, it should also be noted that, for ease of description, the accompanying drawings show only parts related to the disclosure rather than all content of the disclosure. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the disclosure may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

Unless specifically mentioned or obvious from context, as used herein, the term "approximately" is understood to be within a range of normal tolerance in the art, for example, within two standard deviations of a mean.

It should be understood that the term "vehicle" or other similar terms used herein includes general motor vehicles, such as passenger vehicles (including sport utility vehicles, buses, trucks, etc.), various commercial vehicles, etc., and includes hybrid vehicles, electric vehicles, etc. A hybrid vehicle is a vehicle with two or more power sources, such as a vehicle powered by a gasoline engine and an electric motor.

Solutions for determining reliability of visual detection according to various exemplary embodiments of the disclosure will be described below in detail with reference to the accompanying drawings.

Figure 1:
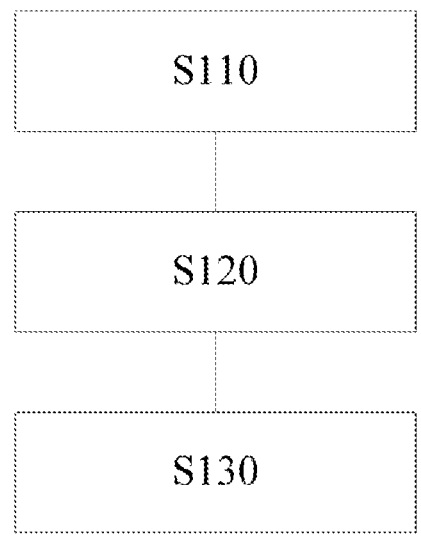
FIG. 1 is a schematic flowchart of a method for determining reliability of visual detection according to an embodiment of the disclosure.

FIG. 1 is a schematic flowchart of a method 1000 for determining reliability of visual detection according to an embodiment of the disclosure. As shown in FIG. 1, the method 1000 for determining reliability of visual detection includes the following steps:

step S110 of receiving a visually detected lane line parameter;

step S120 of comparing a historical lane line parameter with the received lane line parameter, to calculate a historical shrinkage degree of a lane line; and step S130 of determining, based on the historical shrinkage degree, whether there is an error in the visual detection.

In the context of the disclosure, the "visually detected lane line parameter" refers to lane line information detected by various visual sensors (such as a camera and an ultrasonic radar). Visual detection, as an important source for providing information about lane lines, is usually used for construction of a road model.

In an embodiment, the term "historical lane line parameter" refers to a lane line parameter received in a previous frame. Because a visually detected lane line is updated in each frame in real time, the lane line parameter received in the previous frame is compared with a lane line parameter in a present frame to calculate a historical shrinkage degree of the lane line.

In the context of the disclosure, the "historical shrinkage degree" refers to a trend toward or magnitude of inward shrinkage of a lane line detected by a present vehicle by using a visual sensor within a period of time. In an embodiment, the historical shrinkage degree is equal to an addition (under a specific condition) of inward shrinkage values in a plurality of frames. An inward shrinkage value indicates a relative (inward) deflection magnitude of a lane line between two adjacent frames. In one or more embodiments, the inward shrinkage value is represented by an inward deflection angle of an terminal end of the lane line between two adjacent frames.

Environmental factors affect visual detection considerably, and may cause relatively high risks to motion of the present vehicle. Through big data analysis and conclusion on scenarios, the inventors of this application have found that there is a trend of inward shrinkage of both left and right lane lines in scenarios of an unexpected strong light, wet ground with standing water, a lane line that is not completely wiped on the ground, etc., and therefore, an impact of an external environment on visual detection can be reflected by tracking and determining whether there is a feature of inward shrinkage (namely, a historical shrinkage degree) of a lane line in a plurality of frames. If the historical shrinkage degree reaches a certain threshold, which indicates that a result of visual detection in a present frame has a relatively low confidence level (there is an error in the visual detection), relatively strong filtering may be designed in subsequent target selection and guidance, to reduce possible adverse impacts caused by an inaccurate lane line parameter in this frame.

In an embodiment, step S110 includes: receiving a left lane line and a right lane line that are visually detected in a present frame. In an embodiment, a visually detected lane line is updated in each frame in real time. Because of the limitation of a visual distance and the complexity of an actual scenario, the filtering of lane line parameters, which are detected in a plurality of preceding and subsequent frames, by using a filtering solution and the like may result in the loss of a great amount of information about real-time lane line changes, and then a significant difference between a lane line parameter obtained through filtering and a lane line detected in real time, thereby bringing about higher risks. Therefore, an update is performed in each frame based on a parameter of a visually detected lane line. Considering a scenario where it is not conducive to dealing with errors in visual detection by directly using latest parameter information while discarding historical information, a varying status of a lane line in a plurality of preceding and subsequent frames is tracked.

It should be noted that, in the context of the disclosure, left and right lane lines (i.e. two lane lines) visually detected in a present frame are used as a basis for tracking of a lane line and further measurement of a confidence level of visual detection, but in an embodiment, in addition to the left and right lane lines visually detected in the present frame, a lane line of an adjacent lane in the present frame may further be received as a basis for tracking of a lane line. In this way, a false alarm may be further avoided through a position relationship between a plurality of lane lines.

In an embodiment, step S120 includes: calculating an inward shrinkage value of the lane line between two adjacent frames; determining whether the inward shrinkage value reaches a first threshold; and adding the inward shrinkage value up to the historical shrinkage degree of the lane line when the inward shrinkage value is greater than or equal to the first threshold. In addition, the historical shrinkage degree of the lane line is cleared to zero when the inward shrinkage value is less than the first threshold.

In the above embodiment, the first threshold is determined based on difference values of lateral distances between starting ends and between terminal ends of the left and right lane lines in the present frame. For example, in the present frame, the difference value of the lateral distance between the starting ends of the left and right lane lines is d1, and the difference value of the lateral distance between the terminal ends of the left and right lane lines is d2, and a distance between a start and an end is s. In this case, in an embodiment, the threshold may be $$Thres = \arctan\frac{d2-d1}{2s}.$$

Certainly, only an example of the first threshold is given above, and those skilled in the art may adjust the threshold as needed.

In an embodiment, the calculating an inward shrinkage value of the lane line between two adjacent frames includes: updating a recorded lane line parameter of the previous frame based on a motion parameter of a present vehicle; comparing an updated lane line in the previous frame with a lane line corresponding to the present frame; and calculating a relative deflection trend and magnitude of an terminal end of the lane line. Specifically, a lane line in the previous frame may be updated based on vehicle position estimate (VPE). For example, the lane line in the previous frame is adaptively updated based on a lateral/longitudinal corner deviation of the vehicle. An updated lane line in the previous frame based on displacement of the present vehicle may be compared with the lane line corresponding to the present frame, to calculate the relative deflection trend and magnitude of the terminal end of the lane line. In an embodiment, the relative deflection trend and magnitude of the terminal end of the lane line are an angle at which the lane line corresponding to the present frame turns inward relative to the lane line in the previous frame.

In an embodiment, step S130 includes: comparing the historical shrinkage degree with a second threshold; and determining that there is an error in the visual detection when the historical shrinkage degree is greater than or equal to the second threshold. It is determined that there is no error in the visual detection and the historical shrinkage degree is recorded when the historical shrinkage degree is less than the second threshold.

In this embodiment, the second threshold may be determined based on statistical judgment. In an embodiment, the second threshold needs to be designed and selected to balance a ratio of true positives to false positives.

Although not shown in FIG. 1, in an embodiment, the above method 1000 further includes: outputting, upon determining that there is an error in the visual detection, a flag to prompt other modules.

In the method for determining reliability of visual detection according to one or more embodiments of the disclosure, by tracking a varying status of a lane line in a plurality of preceding and subsequent frames, and in combination with a relative position relationship between the left and right lane lines of the present lane in this frame, reliability of visually detecting a lane line can be determined, to deal with visual detection errors caused by impacts of an external environment and avoid a false alarm.

In addition, those skilled in the art readily understand that the method for determining reliability of visual detection provided in the one or more embodiments of the disclosure can be implemented by using a computer program. For example, when a computer storage medium (such as a USB flash drive) storing the computer program is connected to a computer, the method for determining reliability of visual detection in one or more embodiments of the disclosure can be performed by running the computer program.

Figure 2:
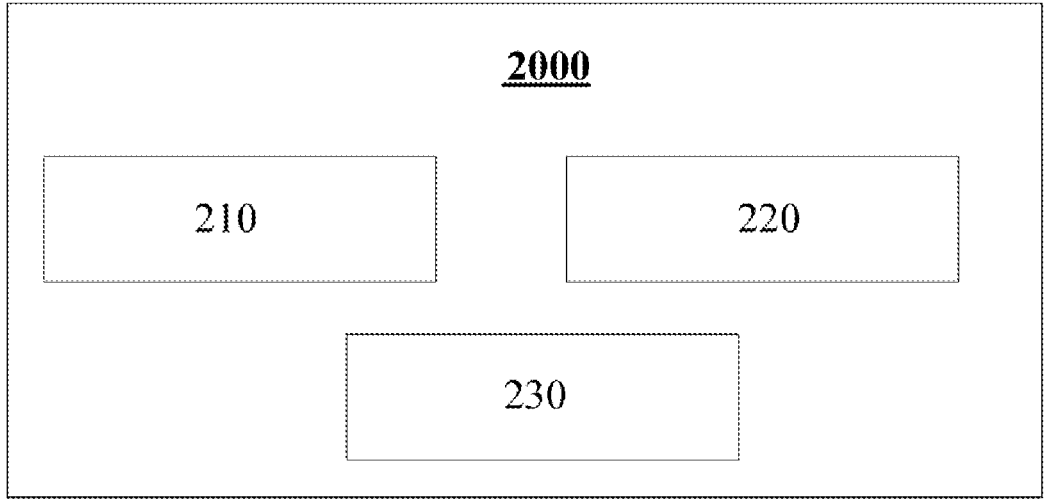
FIG. 2 is a schematic structural diagram of a device for determining reliability of visual detection according to an embodiment of the disclosure.

Referring to FIG. 2, FIG. 2 is a schematic structural diagram of a device 2000 for determining reliability of visual detection according to an embodiment of the disclosure. As shown in FIG. 2, the device 2000 for determining reliability of visual detection includes a receiving apparatus 210, a calculation apparatus 220, and a determination apparatus 230. The receiving apparatus 210 is configured to receive a visually detected lane line parameter; the calculation apparatus 220 is configured to compare a historical lane line parameter with the received lane line parameter, to calculate a historical shrinkage degree of a lane line; and the determination apparatus 230 is configured to determine, based on the historical shrinkage degree, whether there is an error in the visual detection.

In the context of the disclosure, the "visually detected lane line parameter" refers to lane line information detected by various visual sensors (such as a camera and an ultrasonic radar). Visual detection, as an important source for providing information about lane lines, is usually used for construction of a road model.

In an embodiment, the term "historical lane line parameter" refers to a lane line parameter received in a previous frame. Because a visually detected lane line is updated in each frame in real time, the lane line parameter received in the previous frame is compared with a lane line parameter in a present frame to calculate a historical shrinkage degree of the lane line.

In the context of the disclosure, the "historical shrinkage degree" refers to a trend toward or magnitude of inward shrinkage of a lane line detected by a present vehicle by using a visual sensor within a period of time. In an embodiment, the historical shrinkage degree is equal to an addition (under a specific condition) of inward shrinkage values in a plurality of frames. An inward shrinkage value indicates a relative (inward) deflection magnitude of a lane line between two adjacent frames. In one or more embodiments, the inward shrinkage value is represented by an inward deflection angle of an terminal end of the lane line between two adjacent frames.

In an embodiment, the receiving apparatus 210 is configured to receive a left lane line and a right lane line that are visually detected in a present frame. It should be noted that, in the context of the disclosure, left and right lane lines (i.e. two lane lines) visually detected in a present frame are used as a basis for tracking of a lane line and further measurement of a confidence level of visual detection, but in an embodiment, the receiving apparatus 210 is further configured to receive, in addition to the left and right lane lines visually detected in the present frame, a lane line of an adjacent lane in the present frame as a basis for tracking of a lane line. In this way, a false alarm may be further avoided through a position relationship between a plurality of lane lines.

In an embodiment, the calculation apparatus 220 includes: a calculation unit configured to calculate an inward shrinkage value of the lane line between two adjacent frames; a determination unit configured to determine whether the inward shrinkage value reaches a first threshold; and an addition unit configured to add the inward shrinkage value up to the historical shrinkage degree of the lane line when the inward shrinkage value is greater than or equal to the first threshold. In an embodiment, the calculation apparatus 220 further includes: a zero-clearing apparatus configured to clear the historical shrinkage degree of the lane line to zero when the inward shrinkage value is less than the first threshold.

In the above embodiment, the first threshold is determined based on difference values of lateral distances between starting ends and between terminal ends of the left and right lane lines in the present frame. For example, in the present frame, the difference value of the lateral distance between the starting ends of the left and right lane lines is d1, and the difference value of the lateral distance between the terminal ends of the left and right lane lines is d2, and a distance between a start and an end is s. In this case, in an embodiment, the threshold may be $$Thres = \arctan\frac{d2-d1}{2s}.$$

Certainly, only an example of the first threshold is given above, and those skilled in the art may adjust the threshold as needed.

In an embodiment, the calculation unit is configured to: update a recorded lane line parameter of the previous frame based on a motion parameter of a present vehicle; compare an updated lane line in the previous frame with a lane line corresponding to the present frame; and calculate a relative deflection trend and magnitude of an terminal end of the lane line. Specifically, the calculation unit may be configured to: update a lane line in the previous frame based on vehicle position estimate (VPE). For example, the lane line in the previous frame is adaptively updated based on a lateral/longitudinal corner deviation of the vehicle. The calculation unit may compare an updated lane line in the previous frame based on displacement of the present vehicle with the lane line corresponding to the present frame, to calculate the relative deflection trend and magnitude of the terminal end of the lane line. In an embodiment, the relative deflection trend and magnitude of the terminal end of the lane line are an angle at which the lane line corresponding to the present frame turns inward relative to the lane line in the previous frame.

In an embodiment, the determination apparatus 230 is configured to: compare the historical shrinkage degree with a second threshold; and determine that there is an error in the visual detection when the historical shrinkage degree is greater than or equal to the second threshold. In an embodiment, the determination apparatus 230 is further configured to determine that there is no error in the visual detection and record the historical shrinkage degree when the historical shrinkage degree is less than the second threshold. In this embodiment, the second threshold may be determined based on statistical judgment. In an embodiment, the second threshold needs to be designed and selected to balance a ratio of true positives to false positives.

Although not shown in FIG. 2, in an embodiment, the above device 2000 may further include: an output apparatus configured to output, upon determining that there is an error in the visual detection, a flag to prompt other modules.

In one or more embodiments, the above device 2000 for determining reliability of visual detection may be integrated in an autonomous driving system or a driver assistance system, for example, ADAS systems. ADAS systems may also be referred to as advanced driver assistance systems. The advanced driver assistance systems use a variety of sensors (such as a millimeter-wave radar, a laser radar, a monocular/binocular camera, and satellite navigation) mounted on an automobile to sense the surrounding environment at any time during traveling of the automobile, collect data, identify, monitor, and track a still/moving object, and perform system operations and analysis in combination with navigation map data, allowing for a driver to be aware of potential dangers in advance, thereby effectively improving the comfort and safety of the automobile during traveling. In an embodiment, the advanced driver assistance systems include a traffic message channel (TMC) system, an intelligent speed adaptation or intelligent speed advice (ISA) system, a vehicular communication system, an adaptive cruise control (ACC) system, a lane departure warning system (LDWS), a lane keep assistance system, a collision avoidance system or a pre-crash system, a night vision system, an adaptive light control system, a pedestrian protection system, an automatic parking system, a traffic sign recognition system, a blind spot detection system, a driver drowsiness detection system, a hill descent control system, and an electric vehicle warning sounds system.

Figure 3:
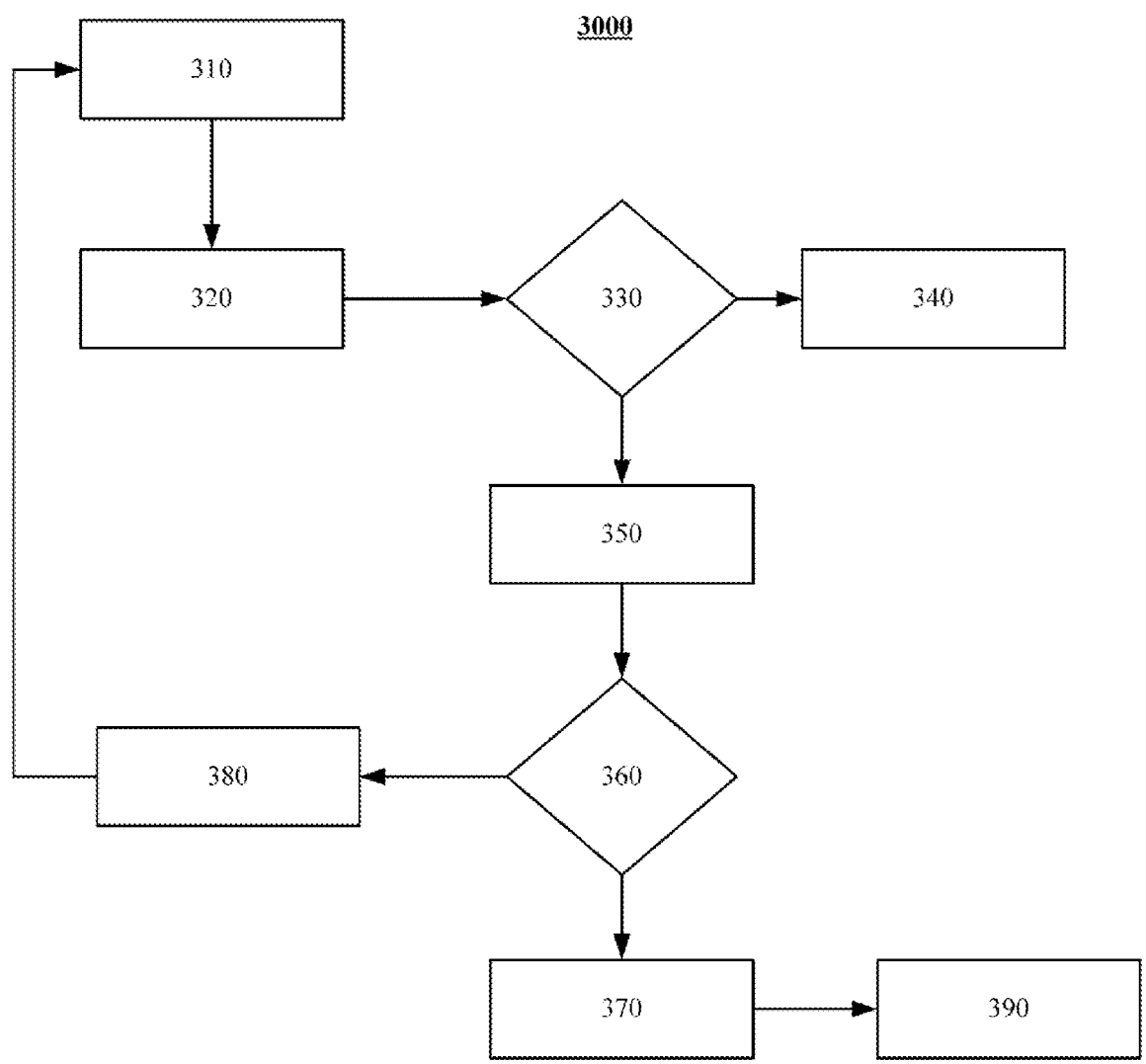
FIG. 3 is a flowchart of quality tracking of a lane line according to an embodiment of the disclosure.

Further referring to FIG. 3, FIG. 3 is a flowchart 3000 of quality tracking of a lane line according to an embodiment of the disclosure. As shown in FIG. 3, in step 310, left and right lane lines in a present frame are obtained by detection of a visual sensor. After an original signal for visual detection is obtained, the recorded lane line parameter in the previous frame is first updated based on a motion parameter of the present vehicle, and then the lane line parameter in the previous frame is compared with the lane line corresponding to the present frame, to calculate the relative deflection trend and magnitude of the terminal end of the lane line, which is used as an increment of the historical shrinkage degree of this lane line. In step 320, an inward shrinkage value of the lane line between two adjacent frames is calculated. Then, it is determined, in step 330, whether a relative shrinkage of the left and right lane lines reaches a threshold, where the threshold may be obtained by comparing difference values of lateral distances between starting ends and between terminal ends of the left and right lane lines. If the threshold is not reached based on the determination in step 330, the inward shrinkage value of the lane line is cleared to zero in step 340. If the threshold is reached, a shrinkage degree of the lane line is added up in step 350. It is further determined, in step 360, whether a shrinkage between a plurality of preceding and subsequent frames reaches another threshold. If the historical shrinkage degree reaches a specified threshold, it is determined, in step 370, that there is an error in the visual detection. If the historical shrinkage degree does not reach the specified threshold, the shrinkage value is added up to a next frame in step 380, and the process returns back to step 310 to start a new round of visual detection. In addition, upon determining that there is an error in the visual detection, a flag is output in step 390, to flag a relatively low confidence level of a visually detected lane line. In this way, in subsequent target selection and guidance, a prompt is given to allow for relatively strong filtering to be designed to reduce possible impacts caused by an inaccurate lane line parameter in this frame.

In the above embodiment, whether a lane line has a relatively low confidence level is determined by tracking performance of the lane line in a plurality of preceding and subsequent frames, and a difference from a scenario in which an actual lane line has a change is found, such that a false alarm can be avoided.

In conclusion, in the solution for determining reliability of visual detection according to the embodiments of the disclosure, by comparing the historical lane line parameter with the received lane line parameter (for example, tracking a varying status of a lane line in a plurality of preceding and subsequent frames) to calculate the historical shrinkage degree of the lane line, reliability of visually detecting a lane line can be determined to deal with visual detection errors caused by impacts of an external environment.

Although only some embodiments of the disclosure are described in the specification, it will be appreciated by those skilled in the art that the disclosure may be embodied in many other forms without departing from the essence and scope thereof. Accordingly, the presented examples and implementations are considered to be illustrative rather than restrictive, and the disclosure may encompass various modifications and replacements without departing from the spirit and scope of the disclosure that are defined by the appended claims.

The invention claimed is:

1. A method for determining reliability of visual detection, the method comprising:
   receiving a visually detected lane line parameter;
   comparing a historical lane line parameter with the received lane line parameter, to calculate a historical shrinkage degree of a lane line; and
   determining, based on the historical shrinkage degree, whether there is an error in the visual detection,
   wherein comparing the historical lane line parameter with the received lane line parameter, to calculate the historical shrinkage degree of the lane line comprises:
   calculating an inward shrinkage value of the lane line between two adjacent frames;
   determining whether the inward shrinkage value reaches a first threshold; and
   adding the inward shrinkage value up to the historical shrinkage degree of the lane line when the inward shrinkage value is greater than or equal to the first threshold.

2. The method according to claim 1, wherein the receiving a visually detected lane line parameter comprises:
   receiving a left lane line and a right lane line that are visually detected in a present frame.

3. The method according to claim 1, wherein the comparing a historical lane line parameter with the received lane line parameter, to calculate a historical shrinkage degree of a lane line further comprises:
   clearing the historical shrinkage degree of the lane line to zero when the inward shrinkage value is less than the first threshold.

4. The method according to claim 1, wherein the first threshold is determined based on difference values of lateral distances between starting ends and between terminal ends of the left and right lane lines in the present frame.

5. The method according to claim 1, wherein the calculating an inward shrinkage value of the lane line between two adjacent frames comprises:

updating a recorded lane line parameter of the previous frame based on a motion parameter of a present vehicle;
comparing an updated lane line in the previous frame with a lane line corresponding to the present frame; and
calculating a relative deflection trend and magnitude of a terminal end of the lane line.

6. The method according to claim 5, wherein the relative deflection trend and magnitude of the terminal end of the lane line are an angle at which the lane line corresponding to the present frame turns inward relative to the lane line in the previous frame.

7. The method according to claim 1, wherein the determining, based on the historical shrinkage degree, whether there is an error in the visual detection comprises:
comparing the historical shrinkage degree with a second threshold; and
determining that there is an error in the visual detection when the historical shrinkage degree is greater than or equal to the second threshold.

8. The method according to claim 7, wherein the determining, based on the historical shrinkage degree, whether there is an error in the visual detection further comprises:
determining that there is no error in the visual detection and recording the historical shrinkage degree when the historical shrinkage degree is less than the second threshold.

9. The method according to claim 1, further comprising:
outputting, upon determining that there is an error in the visual detection, a flag to prompt other modules.

10. A device for determining reliability of visual detection, the device comprising:
a receiving apparatus configured to receive a visually detected lane line parameter;
a calculation apparatus configured to compare a historical lane line parameter with the received lane line parameter, to calculate a historical shrinkage degree of a lane line; and
a determination apparatus configured to determine, based on the historical shrinkage degree, whether there is an error in the visual detection,
wherein the calculation apparatus comprises:
a calculation unit configured to calculate an inward shrinkage value of the lane line between two adjacent frames;
a determination unit configured to determine whether the inward shrinkage value reaches a first threshold; and
an addition unit configured to add the inward shrinkage value up to the historical shrinkage degree of the lane line when the inward shrinkage value is greater than or equal to the first threshold.

11. The device according to claim 10, wherein the receiving apparatus is configured to receive a left lane line and a right lane line that are visually detected in a present frame.

12. The device according to claim 10, wherein the calculation apparatus further comprises:

a zero-clearing apparatus configured to clear the historical shrinkage degree of the lane line to zero when the inward shrinkage value is less than the first threshold.

13. A non-transitory computer storage medium, comprising instructions, where when the instructions are run, a method for determining reliability of visual detection is performed, the method comprising:
receiving a visually detected lane line parameter;
comparing a historical lane line parameter with the received lane line parameter, to calculate a historical shrinkage degree of a lane line; and
determining, based on the historical shrinkage degree, whether there is an error in the visual detection,
wherein comparing the historical lane line parameter with the received lane line parameter, to calculate the historical shrinkage degree of the lane line comprises:
calculating an inward shrinkage value of the lane line between two adjacent frames;
determining whether the inward shrinkage value reaches a first threshold; and
adding the inward shrinkage value up to the historical shrinkage degree of the lane line when the inward shrinkage value is greater than or equal to the first threshold.

14. The device according to claim 10, wherein the calculation unit is configured to:
update a recorded lane line parameter of the previous frame based on a motion parameter of a present vehicle;
compare an updated lane line in the previous frame with a lane line corresponding to the present frame; and
calculate a relative deflection trend and magnitude of a terminal end of the lane line.

15. The device according to claim 14, wherein the relative deflection trend and magnitude of the terminal end of the lane line are an angle at which the lane line corresponding to the present frame turns inward relative to the lane line in the previous frame.

16. The device according to claim 10, wherein the determination apparatus is configured to:
compare the historical shrinkage degree with a second threshold; and
determine that there is an error in the visual detection when the historical shrinkage degree is greater than or equal to the second threshold.

17. The device according to claim 16, wherein the determination apparatus is further configured to:
determine that there is no error in the visual detection and record the historical shrinkage degree when the historical shrinkage degree is less than the second threshold.

18. The device according to claim 10, the device further comprises:
an output apparatus configured to output, upon determining that there is an error in the visual detection, a flag to prompt other modules.

* * * * *